United States Patent [19]

Bruno et al.

[11] Patent Number: 5,557,667
[45] Date of Patent: Sep. 17, 1996

[54] METHOD AND SYSTEM FOR MULTI-CHANNEL DATA AUTOMATIC CALL DISTRIBUTION FOR SEQUENTIALLY LAUNCHED CALLS

[75] Inventors: Richard F. Bruno, Morristown; Mon-Mei Chen, Marlboro; Rosemary H. Harris, Colts Neck; Robert E. Markowitz, Glen Rock, all of N.J.

[73] Assignee: AT&T, Holmdel, N.J.

[21] Appl. No.: 401,314

[22] Filed: Mar. 9, 1995

Related U.S. Application Data

[63] Continuation-in-part of Ser. No. 215,069, Mar. 18, 1994.
[51] Int. Cl.[6] .............................. H04M 3/50; H04G 3/64; H04J 3/12
[52] U.S. Cl. ..................... 379/201; 379/207; 379/265; 379/266; 379/96; 348/14; 370/110.1
[58] Field of Search ................... 379/94, 96, 97, 379/201, 207, 218, 265, 266, 202, 142, 309; 348/14, 15, 16; 370/110.1, 62, 79, 84

[56] References Cited

U.S. PATENT DOCUMENTS

| | | | |
|---|---|---|---|
| 5,061,992 | 1/1990 | Ueno | 348/14 |
| 5,136,636 | 8/1992 | Wegrzynowicz | 379/127 |
| 5,163,087 | 11/1992 | Kaplan | 379/142 |
| 5,184,345 | 2/1993 | Sahni | 379/114 |
| 5,195,086 | 3/1993 | Baumgartner | 379/202 |
| 5,268,958 | 12/1993 | Nakano | 379/211 |
| 5,276,679 | 1/1994 | McKay et al. | 370/84 |
| 5,371,534 | 12/1994 | Dagdeviren et al. | 348/14 |
| 5,392,277 | 2/1995 | Bernstein | 379/207 |
| 5,408,527 | 4/1995 | Tsutsu | 370/110.1 |
| 5,414,760 | 5/1995 | Hokari | 379/94 |
| 5,432,846 | 7/1995 | Norio | 379/142 |
| 5,467,390 | 11/1995 | Brankley et al. | 379/229 |

Primary Examiner—Krista M. Zele
Assistant Examiner—Parag Dharia
Attorney, Agent, or Firm—Brian Dinicold; Robert Rudnick

[57] ABSTRACT

A method of operating a telecommunication network to route a multi-channel call, made up of phone calls placed at substantially the same time, from a caller at a calling number to an agent position at a selected destination of a network subscriber, based on voice and data transport capability, for increased bandwidth communication is disclosed. The selected destination is one of multiple destinations selected by the network subscriber identified by a common telephone number. Each of the phone calls are associated with a plurality of discriminators common to both voice and data calls. An additional data rate discriminator is established which corresponds to a data rate used by the caller when the phone calls are data calls. A first database is accessed in response to receiving the common telephone number from the caller for obtaining a separate subscriber selected destination number for a data call when the separate subscriber selected destination number is based on the common discriminator and the data rate used. The separate subscriber selected destination number is obtained for both phone calls. A second database is provided which has stored fields correlating agent positions with calling numbers connected to channels at the agent positions. The database is queried in response to receipt of one of the calls at the destination. In response to the database query, the phone calls are completed by hunting one of the phone calls to one channel of an agent position and connecting another of the phone calls to another channel of that agent position.

15 Claims, 13 Drawing Sheets

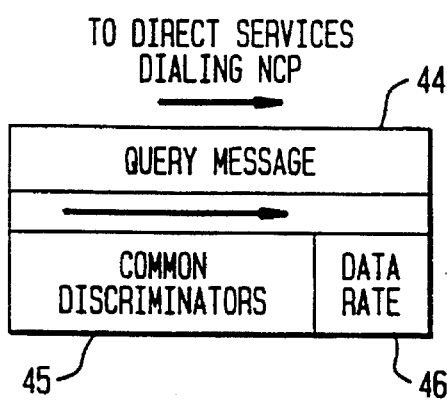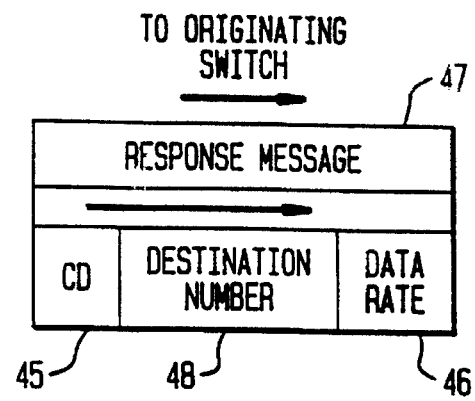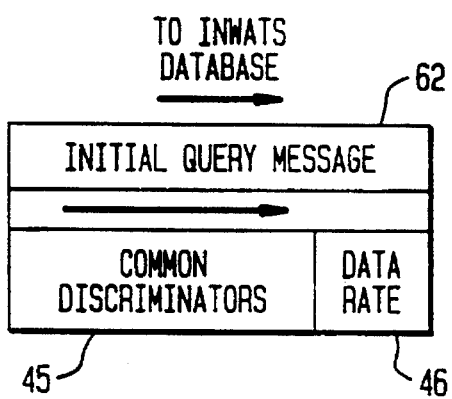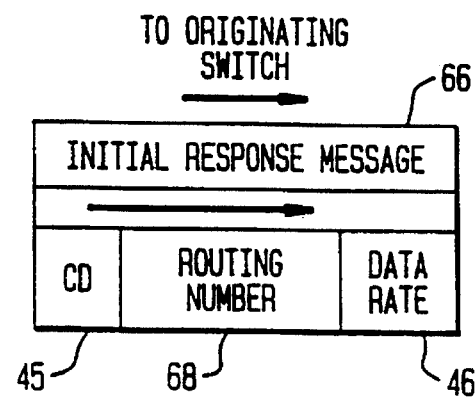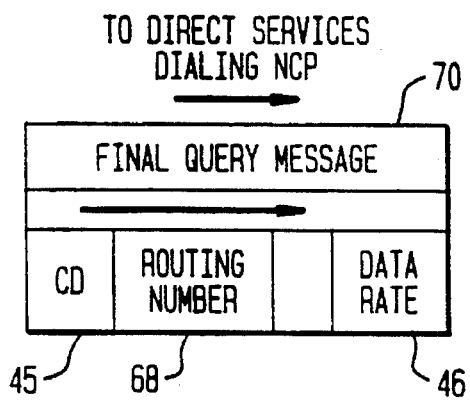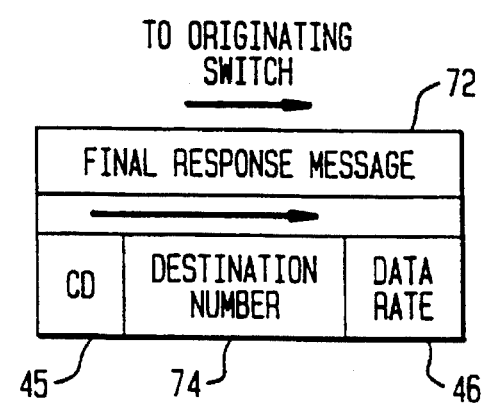

FIG. 9

INCOMING CALL ANI DATABASE

| AGENT POSITION | CHANNEL | CONNECTED ANI |
|---|---|---|
| 1 | A | 935-0356 |
|   | B | 935-0356 |
| 8 | A | 812-2626 |
|   | B | FREE |
| 23 | A | 877-0415 |
|   | B | FREE |
| ⋮ | ⋮ | ⋮ |
| N | A | 447-1145 |
|   | B | FREE |

FIG. 10

AGENT RESOURCE DATABASE

| AGENT POSITION | POSITION AVAILABLE |
|---|---|
| 1 | NO |
| 2 | YES |
| 3 | YES |
| ⋮ | ⋮ |
| 8 | NO |
| ⋮ | ⋮ |
| 23 | NO |
| N | NO |

FIG. 13

| AGENT POSITION | AVAILABLE | CHANNEL | AGENT POSITION (DISCRETE NUMBER) |
|---|---|---|---|
| 1 | NO | A | 905-1121 |
|   |    | B | 905-1122 |
| 2 | NO | A | 905-3123 |
|   |    | B | 905-3124 |
| 3 | YES | A | 905-1128 |
|   |     | B | 905-1129 |
| ⋮ | ⋮ | ⋮ | ⋮ |
| N | YES | A | 905-8406 |
|   |     | B | 905-8407 |

410 412 414 416

METHOD AND SYSTEM FOR MULTI-CHANNEL DATA AUTOMATIC CALL DISTRIBUTION FOR SEQUENTIALLY LAUNCHED CALLS

CROSS REFERENCE TO RELATED APPLICATIONS

This application is a continuation-in-part of copending U.S. patent application Ser. No. 08/215,069 filed Mar. 18, 1994 which is incorporated herein by reference.

FIELD OF THE INVENTION

This invention relates to automatic call distribution and, more particularly, to multi-channel automatic call distribution.

BACKGROUND OF THE INVENTION

The voice services network offers many services and features besides simple "toll-free" 800 and charged 900 services. Initially, a basic "toll-free" 800 number call was a simple one-to-one translation from the 800 dialed call to a traditional POTS destination telephone number with the associated reverse billing capability. At present, a single 800 toll free call placed on the voice services network can now be directed to different destinations based on numerous common discriminators such as the time of day, the originating NPA, basic information about the callers, the location of the calling party, any additional digits collected from the caller, the availability and preferences of the called party, as well as such items as call forwarding options when a busy signal is obtained.

New forms of digital communication services based on digital technologies are now being introduced into the phone networks. These digital communication services require end-to-end digital facilities in contrast to voiceband (POTS) services. Throughout the remainder of this description, data calls will refer to digital communication services calls and voice calls will refer to all forms of voiceband services carried over the POTS network. Digital services send various data calls on network lines such as the 56/64 Kbps data lines to transfer data for multimedia purposes, file and image transfer, slow scan video and numerous other data transfer requirements. Smaller or larger data rates may also be subscribed to depending on the type of digital application, end user's equipment, job or service requirements, and the subscriber's willingness to pay.

Some network subscribers of toll free 800 and similar services are now requesting end-to-end digital connections at various data rates to accommodate different data services such as image transfer and multimedia applications and to support hardware such as video terminals. For example, a high-end mail order service can use an 800 toll-free number for soliciting orders from its catalog. A caller at a video terminal calling the 800 toll-free number would be connected to a position with a video agent who would provide the caller with multimedia information on products and/or services and other ordering information.

In order to provide a high quality video connection, it is desirable to connect the caller to the video agent using two channels rather than the single channel commonly used so that a greater bandwidth is available.

Under international protocols like H.320, video collaborative devices attempt to set up the two channels sequentially, a problem arises in the context of a call to a network subscriber which is actually one of a plurality of destinations of the subscriber identified by a common telephone number. Initially, when a call comes in to the common telephone number for the first single channel it arrives at a switch, such as a PBX or CTX or business line of a call center, and is typically hunted to the next available position or agent location at one of the plurality of destinations. Once the call is "behind the PBX (or CTX)" and switched to the position, no connection information is available to the network for connecting the second channel. Accordingly, there is no way for the network to automatically link the second channel with the same position where the first channel was connected.

Under both international protocols (i.e. H.320) and proprietary protocols (i.e. Indeo), a further problem arises when a call's ANI is blocked for privacy or is launched from "behind" a caller's PBX (or CTX) when ISDN station ID or automatic identification of outward dialing (AIOD) is not available. Because the ANI code of the caller's PBX or CTX will be the ANI code seen by the call center when processing the call, the call center has no information regarding the caller's true endpoint. Accordingly, if two or more callers from behind the same PBX (or CTX) call the same call center, current methods result in the call center a) connecting separate calls from two callers as two channels of one call or b) hunting each channel of the two calls to different agents.

Thus, calls from behind a PBX (or CTX) or blocked for privacy present further problems for a call distibution center.

While it is possible to place a second call to the common telephone number over the second channel, the second call will not link with the first because the second call will be hunted to a next available position or location as if it is a new call. Thus, it will either be captured by a free position placed earlier in the hunt sequence or queue or, if it reaches the position where the first channel is connected, it will bypass that position because the location will appear "busy" and there is no way to identify the second call to the position as the second channel of the first call.

Other systems have attempted to overcome the problem by launching calls to the same number on both channels together. That is to say they are launched sequentially, i.e. following one another so that a first call is launched and then a second call is launched some time later without waiting for the first call to connect or substantially at the same time. Since both channels do not go through the network over identical paths, a delay will exist between the two channels and thus, one channel will arrive at the PBX or CTX before the other channel does. If, by happenstance, the duration of time between the arrival of the two calls is sufficiently small, equipment at the PBX or CTX can presume the calls are the two channels and, using known methods, connect both channels to the same position. However, if one of the channels arrives near simultaneously with an independent call, the equipment at the PBX or CTX will presume those calls are the two channels and improperly connect both channels to the same position. Alternatively, if the duration of time between the arrival of the two calls is too great, they will be treated as separate calls and, as described above, hunted to separate locations.

There is therefore a need in the art for a reliable method and system for connecting a second channel of a call to a position to which a first channel has been hunted and connected.

There is a further need in the art for a reliable method and system for connecting a plurality of channels of a call to a position to a discrete agent position.

SUMMARY OF THE INVENTION

The above problem is solved, and an advance is made over the prior art in accordance with the principles of this invention which provides, as a feature, the linking a plurality of calls over a plurality of channels at an agent position. Various features of the invention are achieved by a video calling method which has the steps of (1) receiving a first video call from a calling terminal, hunting the first video call to a first channel at a video agent position, correlating the first video call with the agent position, and receiving a second video call from the calling terminal and connecting the second video call to a second channel at the video agent position based upon the correlation.

Features of the invention also reside in the disclosed intelligent call processing system for linking a plurality of launched calls from a calling terminal at a resource. The system has a switch including an adjunct processor, a plurality of resources, and a database which is accessable by the adjunct processor. The database has a plurality of stored fields correlating connected calling numbers of incoming calls over channels with resources so that when a calling number of an incoming call arriving at the switch matches a connected calling number in the database, the incoming call will be connected to the correlated resource.

BRIEF DESCRIPTION OF THE DRAWINGS

The foregoing features and advantages of the present invention will be appreciated more fully from the following description, with reference to the accompanying drawings in which:

FIG. 2A is a block diagram which schematically illustrates a query message of the system in FIG. 1 where the query message is directed to the Direct Services Dialing database.

FIG. 2B is a block diagram which schematically illustrates the query response message which is directed back to the originating switch.

FIG. 4A is a block diagram which schematically illustrates an initial query message for the system of FIG. 3 where the query is directed to the INWATS database.

FIG. 4B is a block diagram which schematically illustrates the initial query response message which is directed back to the originating switch.

FIG. 4C is a block diagram which schematically illustrates the final query message directed from the originating switch to the Direct Services Dialing database.

FIG. 4D is a block diagram which schematically illustrates the final query response message which is directed back to the originating switch from the Direct Services Dialing database.

FIG. 9 shows an incoming call ANI database utilized in connection with an embodiment of the invention.

FIG. 10 shows an agent resource database utilized in connection with an embodiment of the invention.

FIG. 13 shows an example database utilized in connection with the embodiments of FIGS. 11 and 12.

DETAILED DESCRIPTION OF THE INVENTION

Figure 1:
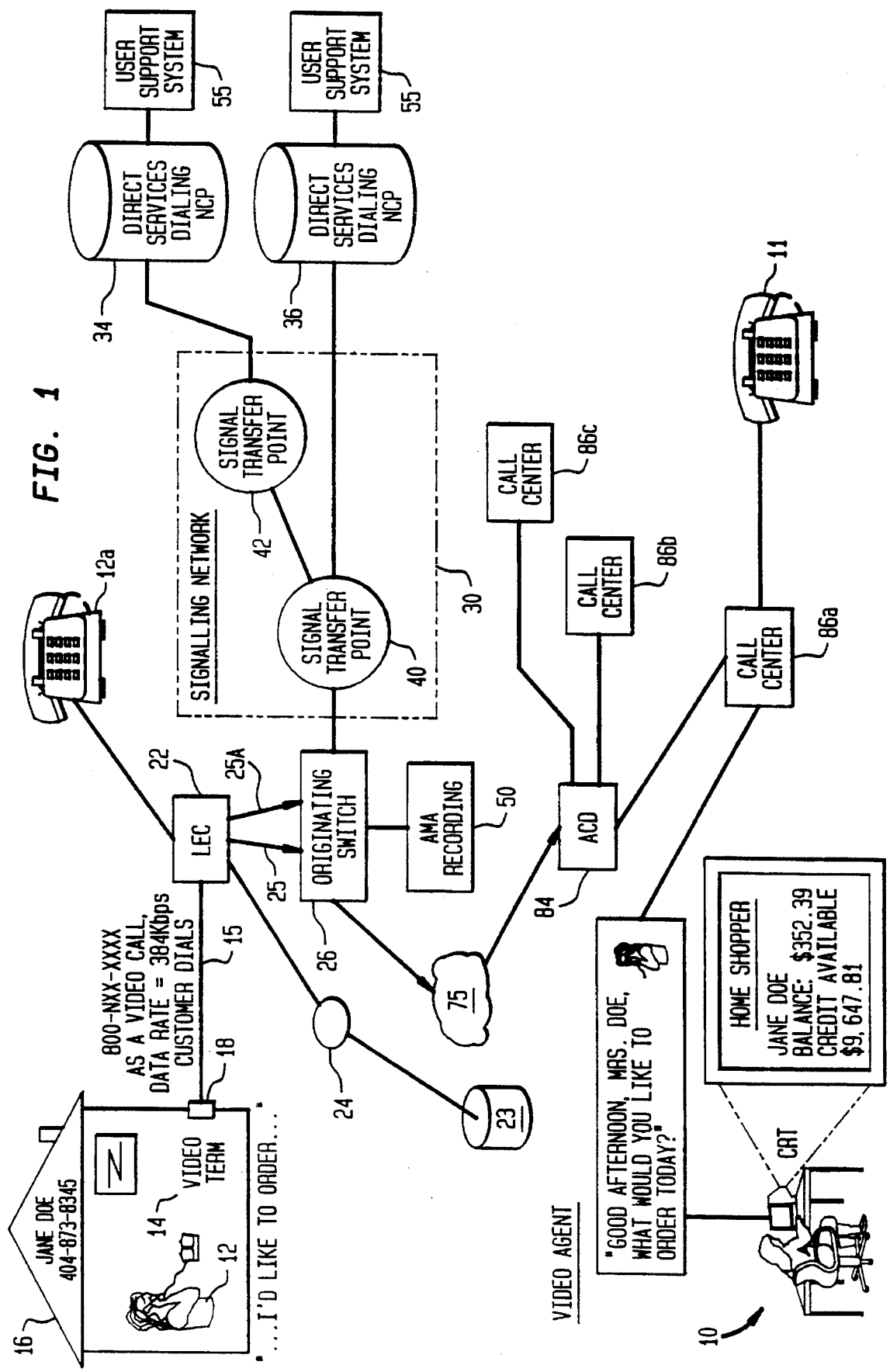
FIG. 1 is a block diagram of an 800 toll free service with end-to-end data capability and direct access from the originating switch to the Direct Services Dialing database.

Referring now to FIG. 1, there is illustrated a block diagram of one exemplary embodiment of the invention, which allows a phone call to be routed from a caller to a selected destination of a network subscriber based on voice and data transport capability. For purposes of understanding, the following description relative to FIG. 1 is set forth based on a toll free network subscriber who owns a home shopping catalog service and has automatic call distribution equipment 84 which is connected to at least one, but preferably a plurality of call centers 86a, 86b, 86c each of which each include a plurality of positions or locations, for example, a video agent 10 and a regular voice agent 11 which can be accessed via the same 800 number. One caller 12 may desire a data connection to the video agent 11 and another caller 12a may desire, via the same 800 number, a call to the regular voice agent 11. Although the present invention will be described with reference to an 800 toll free service, those skilled in the art will recognize that the present invention is also applicable to "900" or other similar calls which utilize call hunting.

In this instance, the caller 12 is using a video terminal 14 at the home residence 16. As preferred, the video terminal is a Vistium video system, commercially available from AT&T. The video terminal 14 is connected to a data trunk phone line 15 via standard data services connection means 18. The caller 12, Ms. Jane Doe, has an originating telephone number, 404- 873-8845, and dials the 800 number for the network subscriber with an application running on the video terminal which utilizes two channels for multimedia data. As preferred, the video terminal is compliant with an international protocol, for example, H.320 or a proprietary protocol, for example, Indeo, and utilizes a communication application which launches the call for one channel, waits for that channel to connect and for receipt of information provided over that connected channel, and then launches a call to connect and link the second channel. Advantageously, as will be recognized from the discussion below, the present invention may be utilized to reliably connect calls from a video terminal with a communication application which launches calls for both channels essentially simultaneously or sequentially so that a first call is launched and after a period of time a second call is launched without regard to the connection status of the first call.

In accordance with the present invention, the call is a data call, illustratively an ISDN video call and the caller 12 requests a data rate of 384 Kbps. The call travels through the data trunk phone line 15 extending from the home residence 16 to the local exchange carrier 22. Each channel of this call has associated with it a plurality of discriminators which are common to both voice and data calls from that home residence 16. These discriminators include common decision variables which are now a part of many toll free 800 service calls and other similar services, such as the originating telephone number, the time of day, the nature of the caller (business or residence), additional information about the caller, as well as other variables such as the availability and preferences of the called party, call forwarding routines and other similar routines. Since the requested data rate could vary from 56 Kbps to 1,536 Kbps and in some instances, higher data rates could be utilized, in addition to these common discriminators an additional data rate discriminator corresponding to the requested data rate of the caller is included.

The local exchange carrier (LEC) 22 receives the call including the data discriminator associated with it. Because the LEC 22 recognizes the call as an 800 toll free number, the LEC queries its 800 toll free database 23 through its signal transfer points 24, and identifies the call as belonging to a certain network carrier, such as AT&T.

The local exchange carrier 22 switches the call to the proper network carrier using bearer capability routing. If the call originally was a voice call, the local exchange carrier would route the call to the proper network carrier on Feature Group-D voice trunks 25, however, since the call is a digital services call, the call is routed on Feature Group-D data trunks 25A. In some instances, all of the FG-D trunks between the LEC and a network carrier will be considered as data trunks because they are all data trunk capable. In this case, the LEC will signal the type of connection in the IAM message through Signaling System 7 Network Interconnect. The local exchange carrier 22 will send the call to an originating switch also known as an Originating Screening Office/Action Point (OSO/ACP) 26, with the caller's number identified by an automatic number identification (ANI) code, the 800 number dialed by the caller, and the other discriminators. The data discriminator can be sent in the IAM or it may be implied from the digital capacity of the data trunks. The number identified by the ANI can also be used for billing purposes and represents a billing number of the caller.

Figure 3:
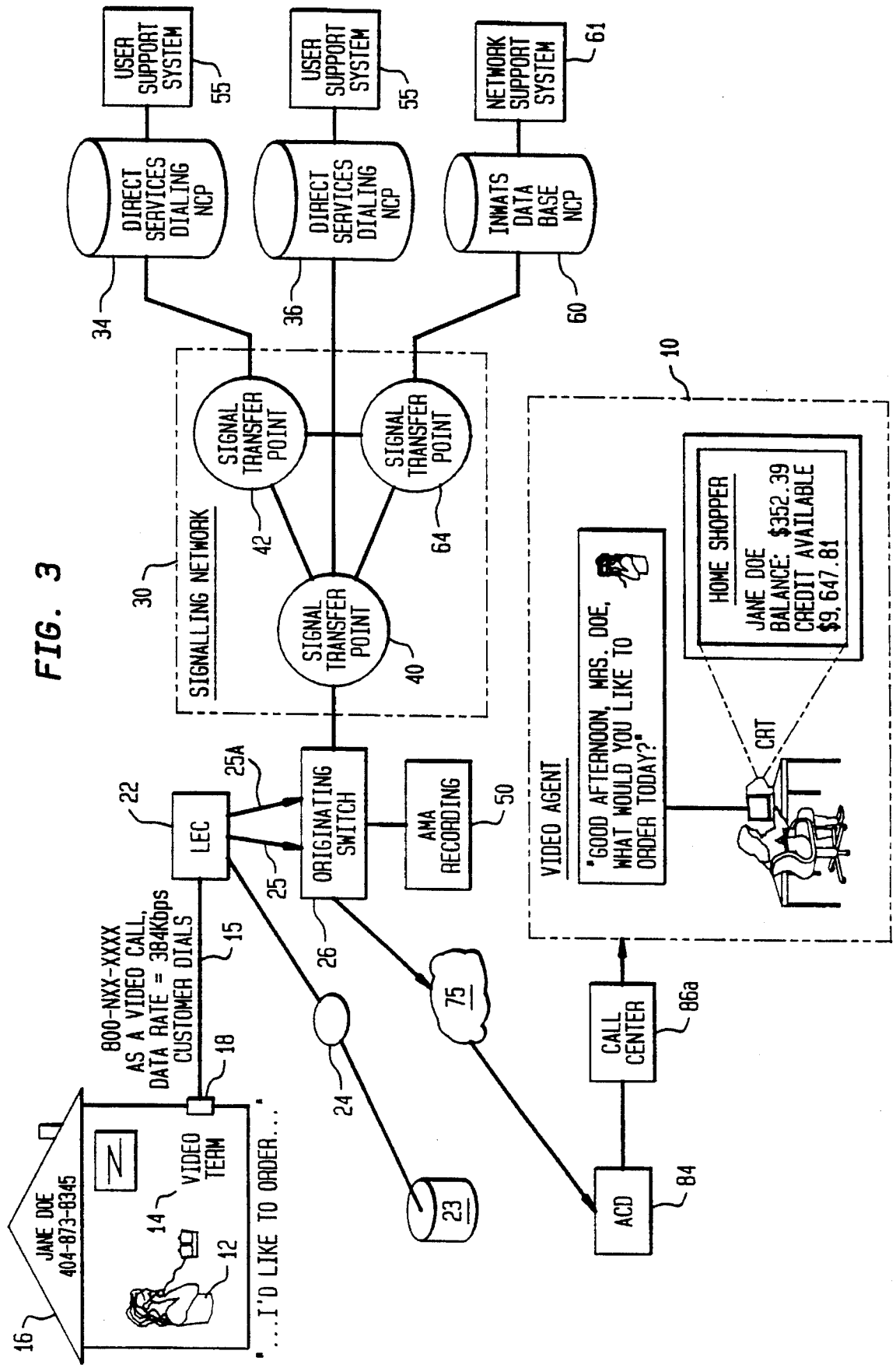
FIG. 3 is a block diagram similar to that of FIG. 1 and illustrating the 800 toll free service where an INWATS database is first accessed.

As shown in FIG. 3, the original caller 10 could have a conventional ISDN basic rate interface (BRI) creating a pure digital connection. The call setup message, which is standard with these ISDN connections, would include some of the common discriminators as well as the desired data rate as an additional discriminator. To be more specific, the Bearer Capability Information Element (BCIE), which is a mandatory part of each ISDN call set-up message, includes several information fields which by themselves do not unambiguously indicate the precise nature of a call being placed in conjunction with that message. However, by considering several of the fields within each BCIE, a call to be routed over a voice band facility can be distinguished from one requiring treatment as a data call, and further, the rate required for the data call can also be determined. The foregoing is illustrated in the following examples, which provide the values of the (a) information transfer capability, (b) transfer mode, (c) information transfer rate, and (d) user information layer protocol fields of a BCIE, with respect to several types of voice and data calls:

Example 1—speech call
  (a) information transfer capability: speech
  (b) transfer mode: circuit
  (c) information transfer rate: 64 kbps
  (d) user information layer protocol: mu-law
Example 2—3.1 kHz audio call
  (a) information transfer capability: 3.1 kHz audio
  (b) transfer mode: circuit
  (c) information transfer rate: 64 kbps
  (d) user information layer protocol: mu-law
Example 3—56 kbps data call
  (a) information transfer capability: unrestricted digital
  (b) transfer mode: circuit
  (c) information transfer rate: 64 kbps
  (d) user information layer protocol: layer 1—rate adaption
Example 4—64 kbps data call
  (a) information transfer capability: unrestricted digital
  (b) transfer mode: circuit
  (c) information transfer rate: 64 kbps
  (d) user information layer protocol: null In the case of data calls with higher data rates, such as 384 kbps data call, the information transfer rate field of the BCIE will indicate the data rate explicitly.

An ISDN connection would be included in a business setting where an ISDN capable private branch exchange (PBX) 28 provides the essential peripheral equipment using the ISDN standard. As noted before, in a non-ISDN connection, the LEC 22 receives the call over a "Switched 56" service and it switches the data call to the Feature Group-D data trunks. If the Signaling System 7 Network Interconnect has not been deployed on the Feature Group-D data trunks, the dialed number and ANI information will be delivered "in band" using some capacity of the digital line. For calls that arrive at all OSO/ACP (Originating Switch 26) on data trunks and for which the Network Carrier receives in band signalling, the OSO/ASP may automatically imply that these are Switched 56 call requests. That is, the data rate discriminator is implied strictly from the capacity of the trunk. No voice calls are made or received on these trunks; they are dedicated only to data calls.

In the embodiment of FIG. 1, in accordance with the present invention, in response to receiving a call placed to a common telephone number (e.g. an 800 telephone number) that needs further translation to ascertain an appropriate destination number, the originating switch 26 formulates a query to a data base so that it may continue processing the call. The software may use Global Title Translation. As will be explained later, in an alternate embodiment, the query can first be made to an INWATS database followed by a query to the Direct Services Dialing-Network Control Point 34.

Once the originating switch 26 has determined where a query message 44 should be sent to, the query is then transferred via signal transfer points 40, 42 to a proper Direct Services Dialing-Network Control Point 34, 36.

For data calls, the query message 44 (FIG. 2A) includes some of the common discriminators (CD) 45 and the data rate discriminator 46. The response message 47 (FIG. 2B) resulting from the query includes a destination number 48 based on the common discriminators 45 and the data rate capability expressed as the data rate discriminator 46. The data call is now routed to the destination number based on the data rate capability of the original call. For example, a 64 Kbps requested data rate is given one destination number to a facility such as in Atlanta for one type of data connection, while a 384 Kbps requested call for a video terminal connection is routed to another facility such as St. Louis where a video agent interacts with the caller to determine what purchases are desired.

In the present embodiment, an automatic message accounting (AMA) facility 50 records calls at the originating switch 26, so that subscribers may be billed. The Direct Services Dialing-Network Control Points 34, 36 also could have associated user support systems 55 for controlling the updating of the database and additional discriminators.

Referring now to the block diagram in FIG. 3, an alternate embodiment of the present invention is shown where the originating switch 26 first queries an INWATS database-Network Control Point 60. In this instance, the initial query 62 (FIG. 4A) includes some of the common discriminators 45, as well as the data rate discriminator 46, and it is transferred through the signalling network 30 via signal transfer points 40, 64 to the INWATS database-Network Control Point 60 (INWATS database-NCP). The INWATS database-NCP 60 passes through the query and returns an initial response message 66 (FIG. 4B) back to the originating switch 26 as a "XXX-XXX-XXXX" routing number 68 together with the common discriminators and the data rate. The INWATS database-NCP 60 would also include network support services 61.

Referring now to the networks of FIGS. 1 and 2, the originating switch 26 then makes a final query message 70 (FIG. 4C) to the proper Direct Services Dialing-Network Control Point through signal transfer points 40 and 42, and includes the common discriminators 45, the routing number 68, and data rate discriminator 46. If the data rate discriminator is blank, the call is interpreted to be a voice call. The final response message 72 (FIG. 4D) of FIG. 3 is similar to that of the embodiment in FIG. 1, which includes the proper destination number 74. The call is then processed through the Network, such as the AT&T Network 75, to the proper destination number associated with a trunk group associated with automatic call distribution (ACD) equipment 84 which hunts the call at a call center 86a, 86b, 86c. As discussed herein, the call centers are not network based however, it will be recognized that the invention is straigtforwardly applicable to a network based call center.

The call center 86a, 86b, 86c includes a) a direct department call group, b) an acd data hunt group or c) a data circular hunt uniform call distribution hunt group, of designated PBX extensions of an ACD split, its final destination position or location which, in the illustrated embodiment for a data call, is the video agent 10.

Figure 5:
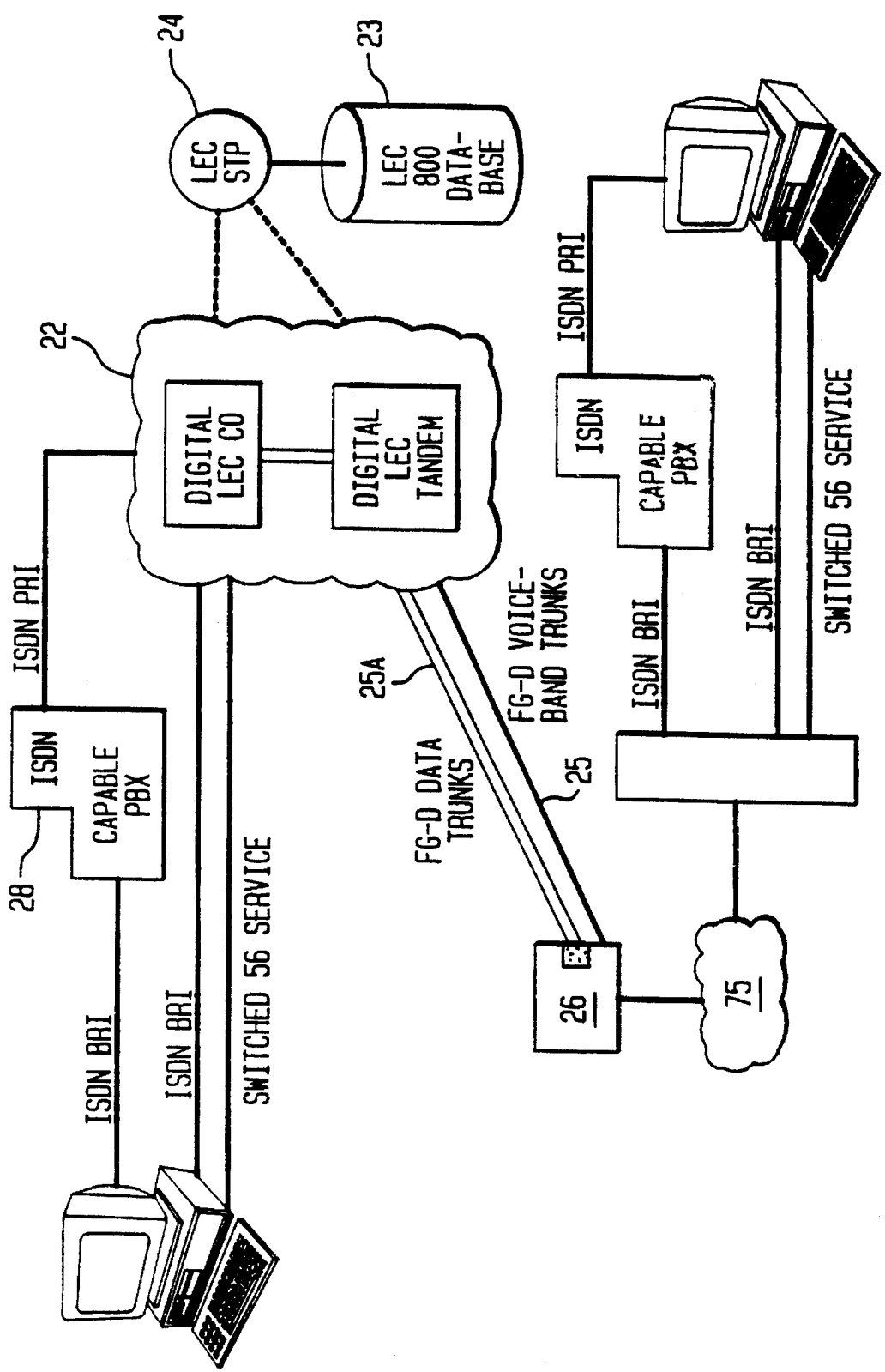
FIG. 5 is a block diagram illustrating the 800 toll free call flow from a caller, through a LEC, and to an originating switch.

As will be evident from FIG. 5, the destination can alternatively be switched egress through the LEC with an ISDN PBX 80, or other ISDN devices or a Switched 56 service. The invention will also work with purely data ACD. In a pure data scenario, the calls would use in band ANI and switched 56 service and ISDN would not be required. Although not illustrated in detail in FIG. 5, the Feature Group-D (FG-D) trunking may be directly connected to the End Office without the need for a digital LEC tandem.

Figure 6A:
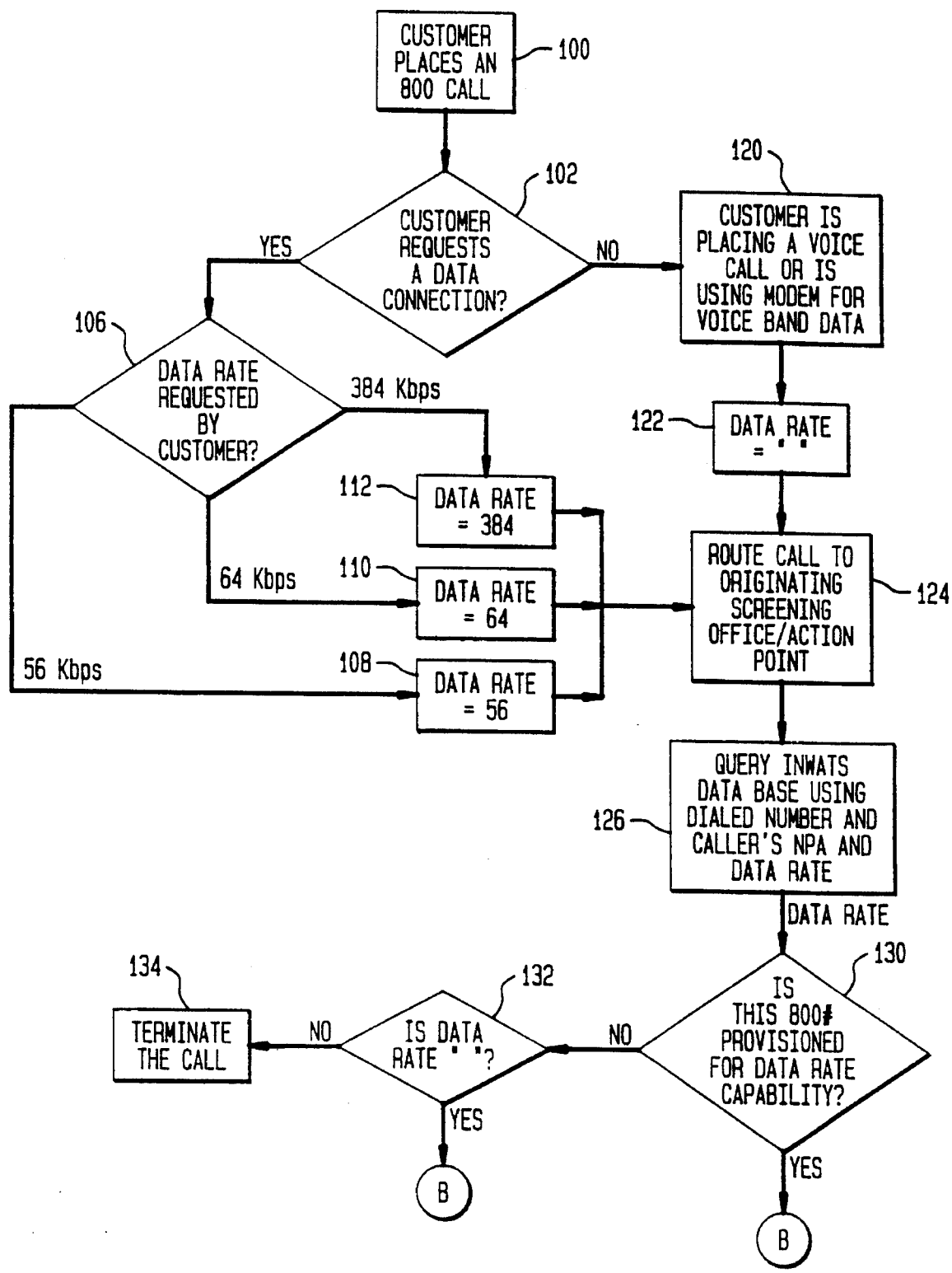
FIGS. 6A and 6B illustrate a flow diagram of the process for routing a first or single bearer channel of a phone call from a caller to a selected destination of a network subscriber based on voice and data transportation capability over two or more channels.
Figure 6B:
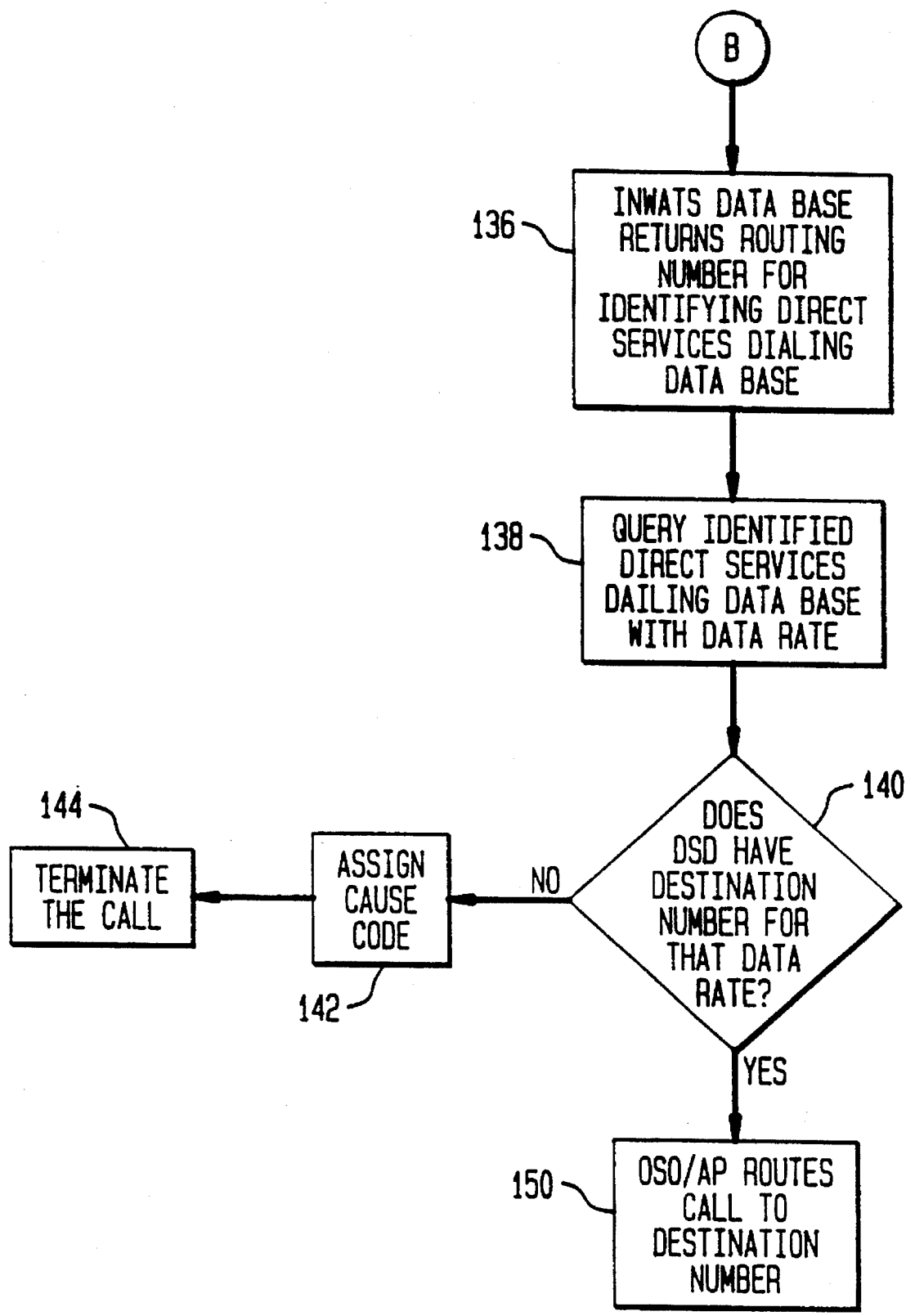

Referring now to FIGS. 6A and 6B, a flow chart illustrating the basic method of connecting a first channel in an embodiment of the present invention is illustrated. For purposes of understanding, the basic steps are set forth following the call reaching the interexchange carrier (IXC) from the LEC beginning with the numeral 100 with successive steps indicated typically as even numbered numerals.

A customer in step 100 initially places a call, illustratively, an 800 toll free call. In step 102, a determination is made as to whether the customer has requested a data connection. For ISDN subscribers, callers can, for example, request a data call by pushing a "data" button on their phone. Many other means can be used to request a data call. For Switched 56 Subscribers, all calls made from Switched 56 terminals are data calls. The data rate requested by the customer is determined in step 106. The data rate can vary, but for illustrative purposes, a 56 Kbps, 64 Kbps, and 384 Kbps rate 108, 110, and 112 are shown.

If the caller has not requested a data connection in step 102, then the caller has placed a voice call or is using a modem, fax or other device for voiceband data (step 120). The data rate discriminator in step 122 is "blank" corresponding to the default of a voice call. Again as in the data call, the voice call is routed to the Originating Screening Office/Action Point (originating switch) in step 124. From the originating switch, a query could be generated as shown in the first embodiment of FIG. 1 to a Direct Services Dialing-NCP to obtain the destination number for that data rate. The illustrated flow chart, however, sets forth the embodiment shown in FIG. 3 where an INWATS database-NCP 60 is first queried.

In step 126, the originating switch queries the INWATS database-NCP using common discriminators such as the dialed number, the callers NPA, and other discriminators mentioned before, as well as the additional data rate discriminator. In step 130 the INWATS database-NCP determines if the 800 number is provisioned for data rate capability. If the data rate field is not a "blank" (step 132) the caller has requested a data connection. If, however, the 800 number is not provisioned to handle a data connection, the call is terminated (step 134). If the data rate field is a "blank", in step 132, corresponding to a voice call, or the 800 number is provisioned for data rate capability in step 130, the INWATS database-NCP returns with the destination number or a routing number (step 136) which identifies the Direct Services Dialing-NCP to be queried to determine the destination number. In step 138, a query is sent by the originating switch to the Direct Services Dialing-NCP with the proper data rate as the discriminator in step 138.

The query deter,nines if the Direct Services Dialing-NCP in step 140 has the destination number for that particular requested data rate. If the destination number is not known for that data rate, then in step 142 a cause, (i.e. error/code typically corresponding to a "bearer rate capability unassigned" message) is assigned and the call is terminated in step 144. Otherwise the originating switch routes the call to the destination number in step 150 which, in the preferred embodiment, is the destination number of a call distribution center 84 which hunts the call to a free position.

Figure 7:
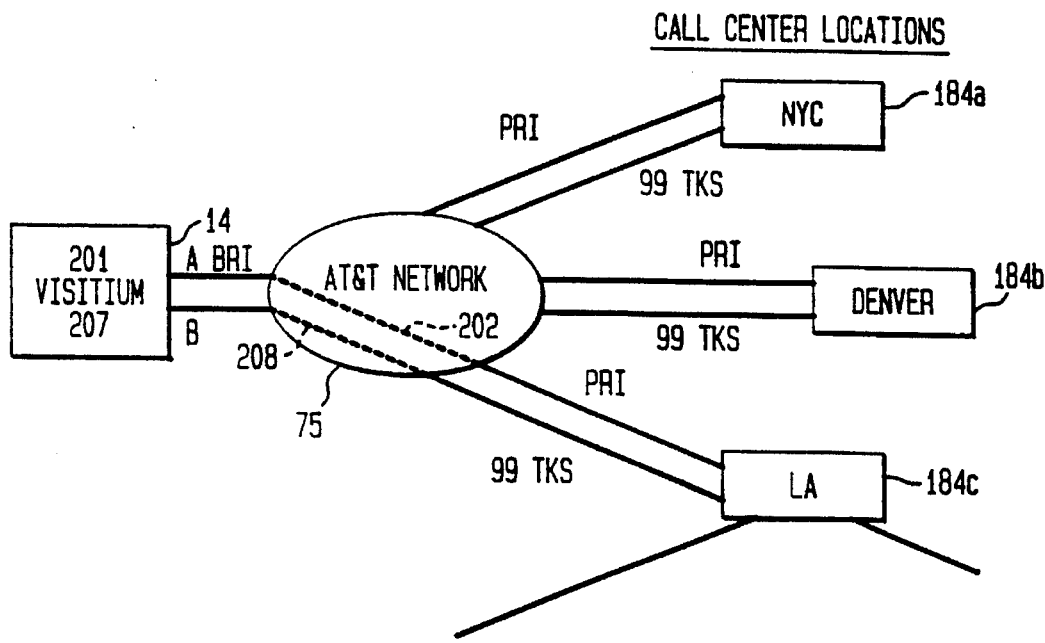
FIG. 7 is a simplified block diagram of an illustrative embodiment of the invention for connecting a first and second channel of a call to the same position.

Having described in detail the process and system for connecting the first channel to the agent position 10, the process of connecting both the first and second channel will be discussed by way of example with reference to FIG. 7. As with FIGS. 1 and 3, the system includes a caller's video terminal 14, shown herein as the preferred Vistium system, a telecommunications network 75, illustratively an AT&T network, a plurality of call centers 184a, 184b, 184c similar in operation to the call centers of FIGS. 1 and 3 each including a terminating switch PBX or CTX 88 for hunting calls to a free position of a plurality of positions, illustratively shown as Vistium equipped agent positions 1001 through 1099, according to a hunt sequence.

In operation, the calling video terminal 14 launches a call to a toll-free 800 number (Step 201), illustratively, an 800 WorldWorks™ data call. The call is screened by a LEC (not shown) to determine the network to which the call should be routed and its type and data rate as described in commonly assigned copending U.S. patent application Ser. No. 215,069 filed Mar. 18, 1994 which is incorporated herein by reference. The LEC determines the call is a data call and is to go to the AT&T network 75 over feature group D trunks connecting the local network (not shown) to the AT&T network 75.

The launched call is routed to the AT&T network and arrives in the data domain. Since the call is an 800 call, the node receiving the call, for example, a 4ESS™ node, requires routing information in order to complete the call. The 4ESS™ launches a query to an NCP for the routing information. The NCP utilizes the Dialed Number Identification Service (DNIS) and "next agent" software to route the call to a terminating trunk group associated with the geographically closest call center where it will be accepted, or, if rejected, routed to another center, illustratively the Los Angeles Call Center 184c (Step 202).

Since the call is an 800 WorldWorks™ data call, the call is routed to the call center over a T-1 path with a PRI (Step 203). The call arrives at a terminating switch PBX or CTX (Centrex) 88 which hunts the call (Step 204) to a direct department call group or, when available, to a simple hunt group of data designated PBX extensions in an automatic call distribution (ACD) split, illustratively shown as discrete agent positions 1001 to 1099. Each of the agent positions 1001 to 1099 are identified by a discrete telephone number. The call is hunted to the A-channel of a BRI extension line that is free (Step 205), shown as the 99th position 1099, where the first channel of the call terminates.

The protocol of the video terminal at the agent position 1099 begins framing over the ISDN A-channel and establishes a voice and data channel back to the calling terminal 14. An application in the video terminal at the agent position 1099 sends the discrete telephone number associated with that agent position 1099, (illustratively 800-658-6443)over the established data channel, to the calling terminal 14 and waits for the second channel (Step 206).

The calling terminal 14 receives the discrete telephone number (800-658-6443) and utilizes it in the out-dial application of the communication application it is running to establish the B-channel connection. The calling terminal 14 then launches a second call to the discrete telephone number (Step 207).

Network routing is conducted as described above. Since the discrete telephone number is not a DNIS number (i.e. it is not a number which will be routed to the closest geographical call center first), the call will not be forwarded to another call center or hunted. Rather, 4ESS routes the call directly to the trunk group associated with that number (Step 208). The call is then passed through the PRI to the PBX or CTX 88 (Step 209). The PBX or CTX 88 terminates the call as designated by the routing instructions passed from the network (Step 210) and passes the call directly to the designated agent position 1099 over the ISDN BRI B-channel where it is linked with the A-channel for two channel operation.

Figure 8:
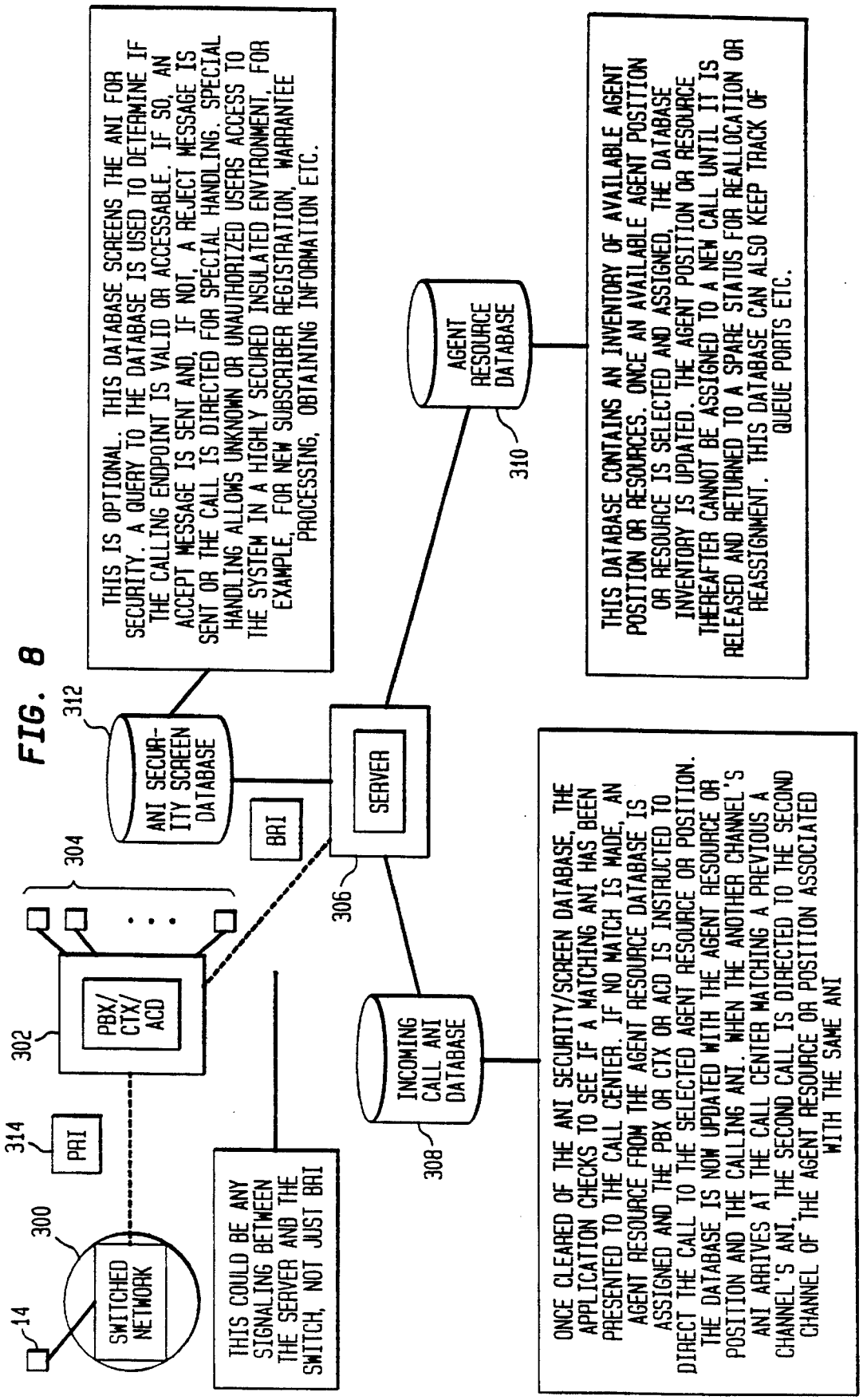
FIG. 8 is a block diagram of an alternative illustrative embodiment of the invention for connecting a first and second channel of a call to the same position.

Referring now to FIG. 8 which illustrates a simplified alternative illustrative embodiment of the invention for connecting a first and second channel of a call to the same position when an application launches the A-channel and B-channel calls at substantially the same time, for example, as done by Intel's Proshare™ application.

The system of FIG. 8 includes a switched carrier network 300, a PBX or CTX or call distribution center 302 connected to a plurality of resources (such as multimedia servers) or agent positions 304, an adjunct processor or Adjunct/Switch Application Interface (ASAI) which acts as an application server or Channel Synch Server 306, an incoming call ANI database 308 and an agent resource database 310. Optionally, the system may also include an ANI security database 312.

The ASAI is an open interface based on CCITT standards for ISDN and ISO standards for data communication. It provides a comprehensive open applications-level, computer to switch interface, offering developers access to, and control of, call processing features and capabilities. Additional information regarding the operation of an AT&T ASAI may be found in the AT&T ASAI specifications entitled "Call Visor ASAI Technical Reference", Publication No. 555230220 and "Call Visor ASAI Protocol Reference", Publication No. 555230221, both published December 1989.

Returning now to FIG. 8, for purposes of illustration, the switched carrier network 300 is connected to the PBX or CTX or call distribution center 302 over a PRI 314, and the PBX or CTX or call distribution center 302 is connected to the Channel Synch Server 306 over a BRI, although other signalling between the server 306 and PBX or CTX or call distribution center 302 may alternatively be used.

The typical contents of the incoming call ANI database 308 is illustrated in FIG. 9 and contains fields comprising a list of agent positions 316 to which a call has been connected correlated with caller's ANIs 318 and channels 320 of the agents or resources which are connected with calls.

The typical contents of the agent resource database 310 is illustrated in FIG. 10 and contains fields comprising a list of agent positions 322 and whether that position is available 324 (i.e. the position is a free position). In other words, it is an inventory of agent positions for keeping track of which resources or agent positions 304 are allocated and unallocated. When the application server 306 assigns an agent position selected from among the agent positions 304, that position is marked as unavailable until the connections to that position are terminated, at which time the position is marked available and may be reallocated.

The incoming call ANI database 308 is configured to check if a different channel of the same ANI has been presented to the call center. If no match is made, a resource or agent position is selected from the agent positions 304 using the agent resource database 310 and the PBX or CTX or call distribution center 302 is instructed to direct the call to that selected agent position (i.e. the call is hunted to a free position). The incoming call ANI database is then updated with the allocated (i.e. connected) agent or resource and the calling ANI information. As shown in FIG. 9 and FIG. 10, the agent resource database includes resources 1 through N or agent positions 1 through N with agent positions 1,8,23 and N allocated and agent positions 2 and 3 unallocated (i.e. positions 2 and 3 are free positions). As illustrated, both channels of position 1 are connected to 935-0356, the A-channel of position 8 is connected to 812-2626, the A-channel of position 23 is connected to 877-0415 and the A-channel of position N is connected to 447-1145.

Additionally, an ANI security database 312 may be added for additional security protection. An example of a security database suitable for use with the present invention is disclosed in U.S. Pat. No. 5,003,595, incorporated herein by reference, and assigned to the assignee of the present invention.

In operation, by way of example, a call from 203-415-1000 is launched on both the A- and B-channels from the calling terminal 14 (i.e. the calling terminal 14 does not wait for an indication that the A-channel has been connected before a B-channel call is launched). The calls proceed through the network as described above however, due to network considerations, it is uncertain which channel will reach the PBX or CTX or call distribution center 306 first.

To ensure that both channels are ultimately connected to the same position, only one channel is hunted to a free position. The other channel will be connected following a query of the incoming call ANI database 308 to identify the agent position where the first channel has been hunted and framed.

As preferred, A-channel calls are always hunted and B-channel calls are never hunted.

When the received call is an A-channel call, it is framed and hunted to a free position via a query of the agent resource database 310. As described above, the incoming call ANI database 308 is then updated to reflect the allocated position. When a B-channel call is received, the incoming call ANI database 308 is queried, using the ANI associated with the call, to identify the position to which the associated A-channel is connected. Once the identification is made, the PBX or CTX or call distribution center 302 directly connects the B-channel to the allocated position. When the call is terminated, the agent resource database 310 will be updated by the application server 306 to reflect that the agent position is available again.

If the B-channel call for a given ANI arrives first, i.e. the incoming call ANI database query indicates that there is no position connected to an A-channel with that ANI. The B-channel call is left in an unanswered condition and not connected by the application server 306, to any agent position. Periodically, queries are made for unconnected B-channels until a connected A-channel is indicated, at which time the B-channel is automatically connected to the location connected to the A-channel as previously described.

Of course it will be recognized that, B-channel calls could be the calls hunted to a free position, with A-channel calls being held. Alternatively, irrespective of whether the first call is an A- or B-channel, the first channel received for a discrete ANI could be hunted to a free position, with the second channel for that ANI being connected to the position indicated by the position connection database query response.

Figure 11:
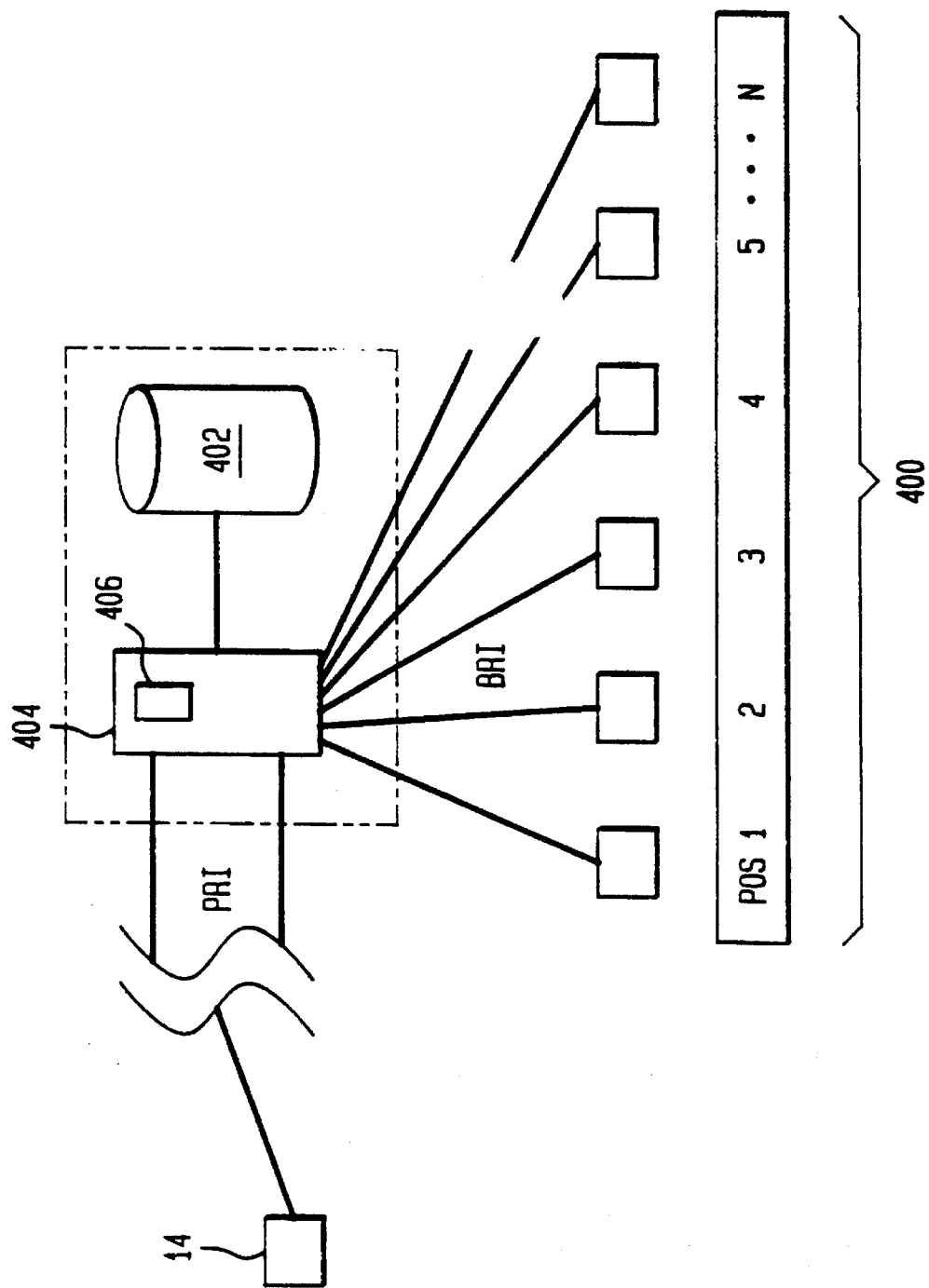
FIG. 11 is a simplified block diagram of another alternative illustrative embodiment of the invention for connecting a plurality of channels at an agent position.
Figure 12:
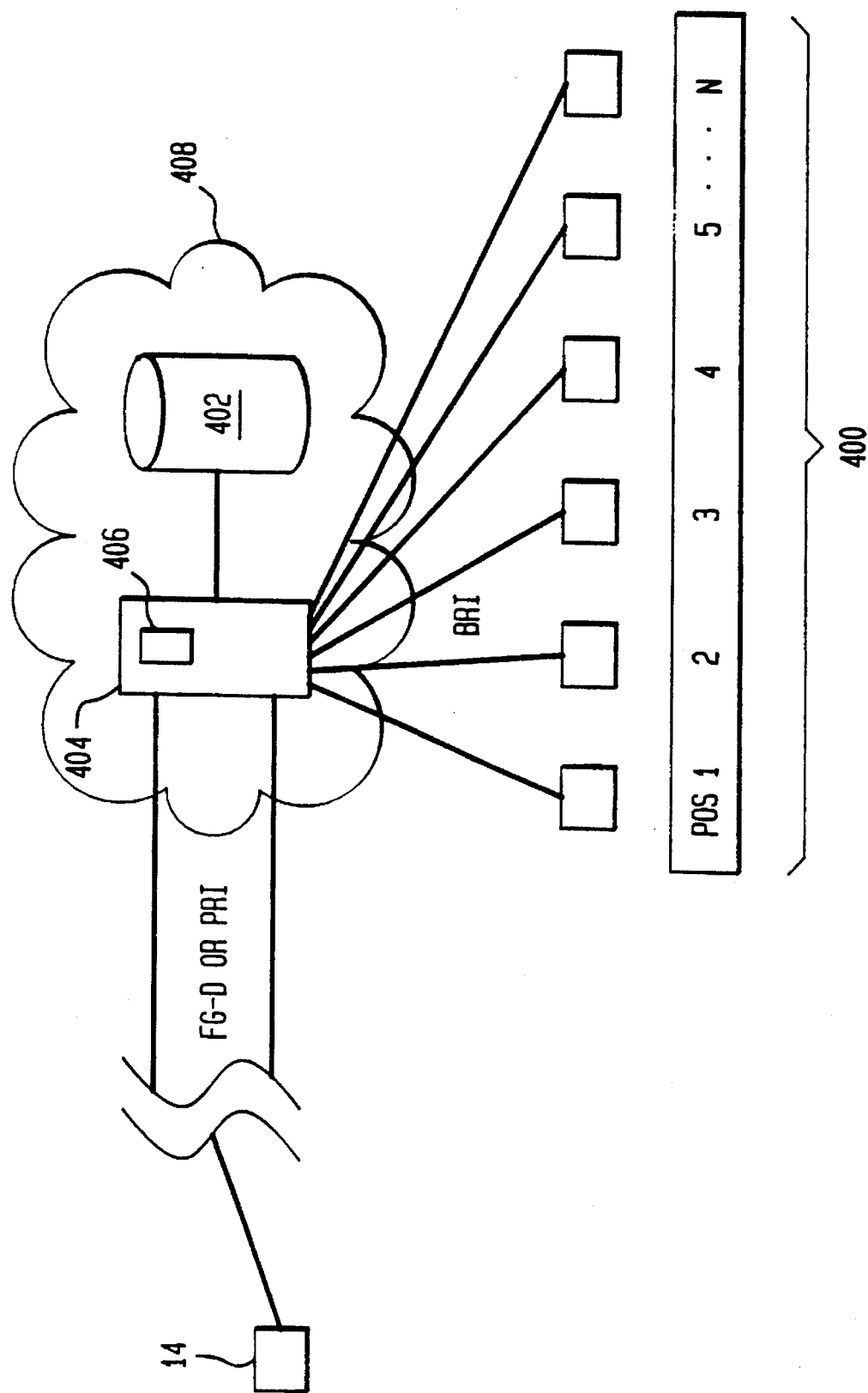
FIG. 12 is a simplified block diagram of a variation of the embodiment of FIG. 11.

FIGS. 11 and 12 illustrate simplified block diagrams of still other preferred embodiments of the present invention. The systems of FIGS. 11 and 12 include a plurality of positions 400, a database 402, and a central node 404 which includes an adjunct processor 406 to access the database 402. The systems of FIGS. 11 and 12 are the same except that in the system of FIG. 11 the central node 404, is preferably a LEC Central Office, whereas in the system of FIG. 12 the central node 404 is part of a carrier's telecommunications network 408.

In the systems of FIGS. 11 and 12, a caller dials a telephone number for the network subscriber using an application running on the caller's video terminal 14 over, for example, the ISDN A-channel. The call is identified to a central node 404, which may be one of a plurality of central nodes (not shown), for processing. The call arrives at the identified central node 404 where the protocol of the central node 404 begins framing the call and establishes a data channel back to the calling terminal. The adjunct processor 406 associated with the central node 404 identifies, by way of query to the database 402, a free position selected from the plurality of positions 400 identified in the database. An illustration of representative database information is shown in FIG. 13, for example, agent positions 410, availability 412, channels for each position 414, and discrete telephone numbers 416 for each agent position. Illustratively, position of FIG. 13 is shown unallocated. Accordingly, the status of position 3 is changed to unavailable and the central node 404 sends the plurality of discrete telephone numbers associated with the selected position, illustratively, 905-1128 and 905-1129, back to the calling terminal over the established data channel. Since each of the discrete telephone numbers connect directly to agent position 3, hunting of the call is not required.

The application running in the caller's video terminal 14 receives the plurality of discrete telephone numbers, terminates the original call, and launches calls to 905-1128 for the A-channel and 905-1129 for the B-channel. As a result, each channel arrives at the selected position.

In an alternative embodiment, useful, for example, where multiple channels from the same caller arrive at the central node 404 as a bundle or at the same time, the central node 404 uses the discrete telephone numbers for the selected position to initiate connections of each of the channels to each discrete telephone number directly, rather than passing the numbers to the caller. Advantageously and conveniently in this embodiment, the caller only has to make one call and security is maintained because the discrete telephone numbers are not acessable to the caller.

Figure 14:
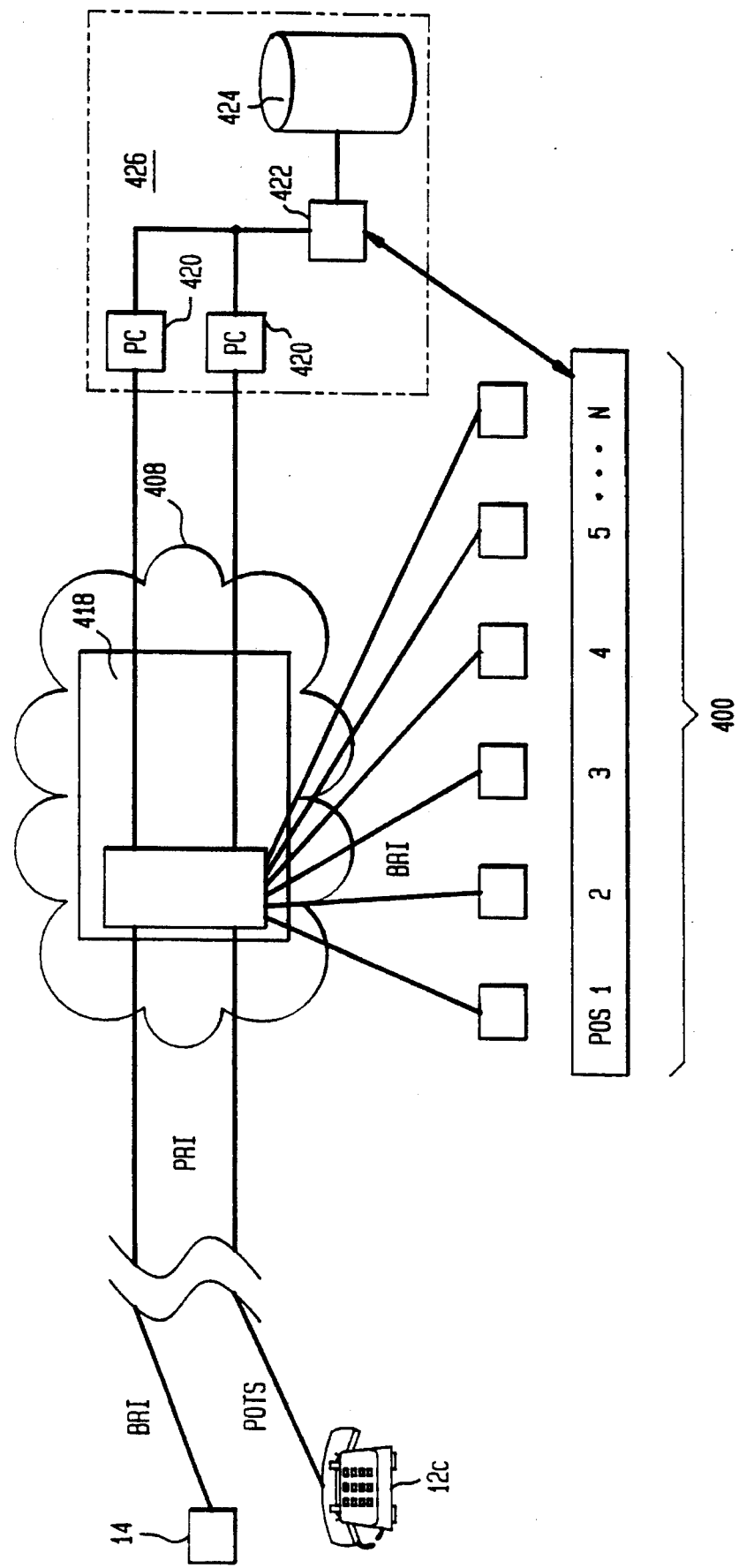
FIG. 14 shows a simplified block diagram of an alternative preferred embodiment utilizing a minimalist approach.

FIG. 14 illustrates another preferred embodiment of the invention utilizing a "minimalist" approach. Advantageously, this approach requires no intelligent network elements. In this embodiment, the network 408 includes a switch element 418 with either no intelligence or which does not utilize the intelligence capabilities in processing a call in accord with the invention. The system includes a plurality of positions or resources 400, each identifiable by a plurality of discrete telephone numbers, and a location 426, situated remotely from the plurality of positions or resources 400. The location 426 includes one or more telephone network interface units 420, for example, a personal computer with a modem, a next agent server 422, and a database 424 associated with the next agent server 422 which includes fields associating with each position or resource 400 a plurality of discrete telephone numbers, one for each channel of each position or resource 400. It will of course be recognized however, that location 426 may alternatively include the plurality of positions or resources 400.

In operation, a caller at either a video terminal 14 or a POTS telephone 12c, wishing to reach a video agent via a multi-channel data call, illustratively a multi-channel video call, places a call to a telephone number which will connect the caller to the next agent server 422 via one of the telephone network interface units 420. The next agent server 422 is configured to monitor the plurality of positions or resources 400 and identify a free position or resource from the plurality of positions or resources 400. Upon identifying a free position or resource, the next agent server 422 marks the position as being in use and accesses the database 424. The server 422 identifies the discrete telephone numbers associated with the position and furnishes them to the caller via the POTS connection 12c or furnishes them to the application running in the video terminal 14. The caller then terminates the call and initiates calls to one of the discrete telephone numbers for each channel of the video terminal 14 to be connected to the selected position or resource thereby linking all the channels at the same resource or position.

It will be recognized that, while the invention has been discussed in mostly in connection with 800 (toll-free) telephone numbers, the invention may be utilized with various combinations of toll-free and non toll-free numbers. For example, both the A-channel and B-channel calls could be to 800 numbers, in which case both calls would both be toll-free. Alternatively, the first call could be to a 700 or 900

(toll call) telephone number and the second to a toll-free number, so the caller only incurs the cost of the initial call. In another variation, the first call could be to a 700 or 900 (toll call) telephone number and the second to a POTS number, in which case the caller would also incur the cost of both calls, but potentially at different rates for each. Finally, both numbers could be POTS numbers, in which case the caller would incur the cost of both calls and the network processing associated with 800 calls would be unnecessary.

It should be noted however, that if the first and second calls are both to 700 telephone numbers, because they are carrier specific numbers, both 700 telephone numbers must be carried by the same network carrier.

Additionally, while the invention has been discussed primarily in connection with two channel ISDN calls for clarity of understanding, the invention may readily be implemented to work with a plurality of channels, for example, where Px64 is utilized.

Although specific network configurations, call distribution centers and agent positions have been described and illustrated in connection with preferred embodiments of the invention, it will be recognized that numerous alternative hunting or call distribution configurations are possible, as are other combinations of numbers or voice only and multimedia positions. It will also be recognized that additional network elements, for example, additional switches and billing equipment, will also be utilized in the processing of the calls but are not illustrated because they are unnecessary for an understanding of the invention.

Thus, while there have been shown and described and pointed out fundamental novel features of the invention as applied to preferred embodiments thereof, it will be understood that various omissions, substitutions and changes in the form and details of the disclosed system and in its operation, may be made by those skilled in the art without departing from the spirit and scope of the invention. It is the intention, therefore, to be limited only as indicated by the scope of the claims appended hereto.

That which is claimed is:

1. A method of operating a telecommunication network to route a multi-channel call including a first phone call and a second phone call placed at substantialy the same time, from a caller at a calling number to an agent position at a selected destination of a network subscriber based on voice and data transport capability for increased bandwidth communication, wherein the selected destination is one of a plurality of destinations selected by the network subscriber identified by a common telephone number, the method comprising:

associating with each of the first and second phone calls a plurality of discriminators common to both voice and data calls, and an additional data rate discriminator corresponding to a data rate used by the calling party, when the first and second phone calls are data calls, accessing a first database in response to receiving the common telephone number from the calling party for obtaining a subscriber selected destination number for a voice call based on the common discriminators and a separate subscriber selected destination number for a data call, wherein the separate subscriber selected destination number is based on the common discriminator and the data rate used by the caller, obtaining the separate subscriber selected destination number for both the first and second phone calls, providing a second database having a stored plurality of fields each correlating agent positions with calling numbers connected to channels at the agent positions, querying said second database in response to receipt of one of the first or second calls at the destination, and responsive to said second database query, completing the first and second phone calls by hunting one of the first or second phone calls to a first channel of an agent position at the destination and connecting the other of the first or second phone calls to a second channel of the agent position.

2. The method of claim 1 further including the step of:

storing the calling number in a database field corresponding to the agent position and the first channel.

3. The method of claim 1 wherein the querying step includes the steps of:

extracting an ANI code from the first phone call; and comparing the ANI code with calling numbers stored in the database.

4. A method of establishing a multi-channel call between a caller and an agent when the multi-channel call comprises a first phone call from a caller associated with a first channel and a second phone call from the caller associated with a second channel, the second call having been placed at substantially the same time as the first phone call for establishing an increased bandwidth data call, the first and second calls having been made by the caller placing both the first and second phone calls to a destination number selected by a network subscriber based on voice and data transport capability, and wherein the destination number is one of a plurality of destination numbers selected by the subscriber identified by a common telephone number, the method comprising:

associating with the first phone call and the second phone call a plurality of discriminators common to both voice and data calls and an additional data rate discriminator corresponding to the data rate used by the caller, accessing a first database in response to receiving the common telephone number from the caller to obtain a routing number, selecting a second database based on the routing number, accessing the second database for obtaining a destination number selected by the subscriber for a data call, wherein the destination number selected by the subscriber for a data call is based on the common discriminators and the data rate used by the caller, and completing the first and second phone calls to said agent at the destination number selected by the subscriber by extracting a first ANI code from the first phone call, hunting the first phone call to a first channel of the agent, storing the first ANI code in a third database correlating stored ANIs with channels of agents, extracting a second ANI code from the second phone call, comparing the second ANI code with the ANIs stored in the third database, and connecting the second phone call to a second channel of the agent correlated to the first ANI.

5. The method of claim 4 further including the step of marking the agent unavailable when the first and second phone calls are connected to the first and second channels of the agent.

6. A system for routing a phone call, from a caller at a calling number identifiable by an ANI code, to devices at a destination number selected by a network subscriber based on voice and data transport capability, wherein the phone call is one of either a voice or multi-channel data call, and wherein the destination number is one of a plurality of destination numbers selected by the subscriber identified by a common telephone number, and wherein each device is configured with a plurality of channels, the system comprising:

means for associating with a phone call a plurality of discriminators common to both voice and data calls and an additional data rate discriminator for a data call corresponding to the data rate used by the caller, means for accessing a first database in response to receiving the common telephone number from the caller for obtaining a destination number selected by the network subscriber for a data call, wherein the destination number selected by the network subscriber is based on the common discriminator and the data rate used by the caller, a second database having a plurality of fields each correlating channels of devices with stored ANI codes so as to identify connections between callers and channels of devices, means for accessing the second database, in response to receiving the phone call, and for extracting the ANI code from the phone call and comparing the extracted ANI code with the stored ANI codes, and means for completing the phone call by (a) hunting the call to a channel of one of the devices at the selected destination number when the extracted ANI code does not match a stored ANI code and, when the extracted ANI code matches a stored ANI code, completing the phone call by connecting the phone call to a channel of the device correlated to the stored ANI code which is not a connected channel of the device.

7. The system according to claim 6 including means for reading the data rate from a call setup message when the caller has an ISDN connection.

8. The system according to claim 6 wherein the device is a terminal at an agent position.

9. The system according to claim 6 wherein the device is a multimedia server.

10. The system according to claim 6 wherein the means for completing the phone call is a PBX.

11. The system according to claim 6 wherein the means for completing the phone call is a CTX.

12. A system for routing a phone call, from a caller at a calling number identifiable by an ANI code, to devices at a destination number selected by a network subscriber based on voice and data transport capability, wherein the phone call is one of either a voice or multi-channel data call, and wherein the destination number is one of a plurality of destination numbers selected by the subscriber identified by a common telephone number, and wherein each device is configured with a plurality of channels, the system comprising:

means for associating with a phone call a plurality of discriminators common to both voice and data calls and an additional data rate discriminator for a data call corresponding to the data rate used by the caller, means for accessing a first database in response to receiving the common telephone number from the caller to obtain a routing number, means for selecting a second database based on the routing number, means for accessing the second database in response to receiving the common telephone number from the caller for obtaining a destination number selected by the network subscriber for a data call, wherein the destination number selected by the network subscriber is based on the common discriminator and the data rate used by the caller, a third database having a plurality of fields each correlating channels of devices with stored ANI codes so as to identify connections between callers and channels of devices, means for accessing the third database, in response to receiving the phone call, and for extracting the ANI code from the phone call and comparing the extracted ANI code with the stored ANI codes, and means for completing the phone call by (a) hunting the call to a channel of one of the devices at the selected destination number when the extracted ANI code does not match a stored ANI code and, when the extracted ANI code matches a stored ANI code, completing the phone call by connecting the phone call to a channel of the device correlated to the stored ANI code which is not a connected channel of the device.

13. The system according to claim 12 wherein the means for completing the phone call is a PBX.

14. The system according to claim 12 wherein the means for completing the phone call is a CTX.

15. The system according to claim 12 wherein the device is a multimedia server.

* * * * *